United States Patent [19]
Daniels

[11] Patent Number: 6,000,925
[45] Date of Patent: Dec. 14, 1999

[54] GAS ASSISTED INJECTION MOLDING SYSTEM

[75] Inventor: Vernon Arthur Daniels, Brooklyn, Mich.

[73] Assignee: Alexander V. Daniels, Brooklyn, Mich.

[21] Appl. No.: 08/996,177

[22] Filed: Dec. 22, 1997

[51] Int. Cl.[6] .................................................. B29C 45/16
[52] U.S. Cl. ......................... 425/130; 264/572; 425/145
[58] Field of Search .................................. 425/130, 145, 425/146; 264/572

[56] References Cited

U.S. PATENT DOCUMENTS

| | | |
|---|---|---|
| 4,106,887 | 8/1978 | Yasuike et al. . |
| 4,136,220 | 1/1979 | Olabisi . |
| 4,140,672 | 2/1979 | Kataoka . |
| 4,247,515 | 1/1981 | Olabisi . |
| 4,498,860 | 2/1985 | Gaham . |
| 4,740,150 | 4/1988 | Sayer . |
| 4,824,732 | 4/1989 | Hendry et al. . |
| 4,830,812 | 5/1989 | Kauer . |
| 4,855,094 | 8/1989 | Hendry . |
| 4,913,644 | 4/1990 | Kauer . |
| 4,917,594 | 4/1990 | Gellert et al. . |
| 4,923,666 | 5/1990 | Yamazaki et al. . |
| 4,935,191 | 6/1990 | Baxi . |
| 4,943,407 | 7/1990 | Hendry . |
| 4,944,910 | 7/1990 | Hendry . |
| 4,948,547 | 8/1990 | Hendry . |
| 4,990,083 | 2/1991 | Bernhardt . |
| 5,015,166 | 5/1991 | Baxi . |
| 5,028,377 | 7/1991 | Hendry . |
| 5,039,463 | 8/1991 | Loren . |
| 5,054,689 | 10/1991 | Hunerberg et al. . |
| 5,198,238 | 3/1993 | Baxi . |
| 5,302,339 | 4/1994 | Baxi et al. . |

Primary Examiner—Tim Heitbrink
Attorney, Agent, or Firm—Howard & Howard

[57] ABSTRACT

A gas assisted injection molding system includes a gas injection pin and gas vent pin which are independently, selectively extendable into a cavity of a mold. Each of the gas injection pin and gas vent pin include a first actuator and a second actuator. Each first actuator selectively extends and retracts the pin into and out of the cavity of the mold. Each of the second actuators selectively opens and closes a valve within the pin, thereby selectively permitting and restricting the flow of gas through the pin.

13 Claims, 2 Drawing Sheets

GAS ASSISTED INJECTION MOLDING SYSTEM

BACKGROUND OF THE INVENTION

The present invention relates generally to injection molding and more particularly to a gas assisted injection molding system having improved gas nozzles.

Known gas assisted injection molding systems generally comprise a mold having an inner surface defining a cavity. A gas nozzle is selectively extendable into the cavity. In operation, a short shot of resin is introduced into the cavity. After initial resin injection, the resin is permitted to partially cool. The nozzle is extended into the cavity, piercing the partially cooled resin wall. Then, high pressure gas is injected into the resin through the nozzle. The pressurized gas displaces the molded resin, thereby forming a gas channel. Because the resin adjacent the surface of the mold cools faster than the resin in the center of the cavity, the pressurized gas generally displaces material from the center of the gas channel or thicker portions of the resin, toward the mold surfaces. In this manner, hollow articles or articles having hollow portions, are molded. The pressure of the gas is either maintained or profiled during the cooling phase, typically approximately 20 to 50 seconds. After the article has cooled, the pressurized gas inside the article is vented through the gas nozzle, thereby relieving the high pressure in the article prior to removing the article from the mold. The gas nozzle is then retracted from the cavity.

After the article is removed from the mold, the mold is reclosed and a subsequent cycle is operated in a similar manner. In the known system, when the pressurized gas is vented through the gas nozzle, some of the resin may be carried by the gas into the gas nozzle, thereby partially or completely plugging the nozzle with resin. At that time, the operation of the injection molding system must be temporarily ceased in order to clean the gas nozzle.

SUMMARY OF THE INVENTION

The present invention provides a gas assisted injection molding system having a gas injection pin and an independent gas vent pin, both of which are self cleaning.

The gas assisted injection molding system generally comprises a mold having an inner surface defining a cavity. A gas injection pin is mounted adjacent the inner surface of the cavity and is selectively extendable into the cavity and gas channel. A gas supply supplies gas to the cavity via the gas injection pin. A separate gas vent pin is also mounted adjacent the inner surface of the cavity and is selectively extendable into the cavity independently of the gas injection pin. A valve in the gas vent pin selectively permits gas to exit the cavity and/or gas channel via the gas vent pin.

Each of the gas injection pin and gas vent pin include a pair of independently operable actuators, such as a cylinder and piston. For each pin, a first actuator selectively extends and retracts the pin into and out of the cavity. A second actuator selectively opens and closes a valve in the pin, opening or restricting the passage of gas through the pin.

In one embodiment, each first actuator comprises a piston mounted in a cylinder. A second cylinder extends from the first piston. A second piston is disposed within a second cylinder and selectively opens and closes the gas passageway through the pin.

In operation, both pins may be initially retracted and both passageways are closed. Alternatively, the gas injection pin may be extended during the cavity fill. The resin is then introduced into the cavity. After the resin has cooled partially, the first actuator in the gas injection pin extends the gas injection pin into the cavity and/or gas channel, such that a nozzle of the gas injection pin pierces the partially cooled wall of the resin. Alternatively, the vent pin may be extended into the cavity prior to resin injection. Then, the second actuator of the gas injection pin opens the valve in the gas injection pin permitting the flow of the high. pressure gas through the nozzle into the cavity. The gas displaces the molten resin in a manner well known in the art. The pressure is maintained during the cooling phase, preferably approximately 20 to 50 seconds or more.

At the end of the cooling cycle, the first actuator of the gas vent pin extends the gas vent pin into the cavity, such that the nozzle of the gas vent pin pierces the partially cooled wall of the resin. Initially, the second actuator maintains closure of the gas vent valve during insertion of the gas vent pin. Then, the second actuator opens the gas vent valve, thereby venting the gas from the gas channel through the nozzle in the gas vent pin. Alternatively, if only one pin is used, the gas injection pin is fully retracted from the cavity, also venting the internal gas pressure.

At the end of the cycle, gas is pressurized through the nozzle, cleaning any remaining resin. The second actuator of the gas injection pin closes the gas injection valve as the first actuator of the gas injection pin retracts the gas injection pin out of the cavity. In this manner the high pressure gas effectively cleans the gas injection pin of any residual resin. Then, a low pressure or volume shot of gas is introduced into the cavity via the gas vent pin, to insure cleaning of the vent pin. The gas vent pin is then retracted by the first actuator of the gas vent pin as the second actuator of the gas vent pin closes the gas vent valve.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF PREFERRED EMBODIMENTS

Figure 1:
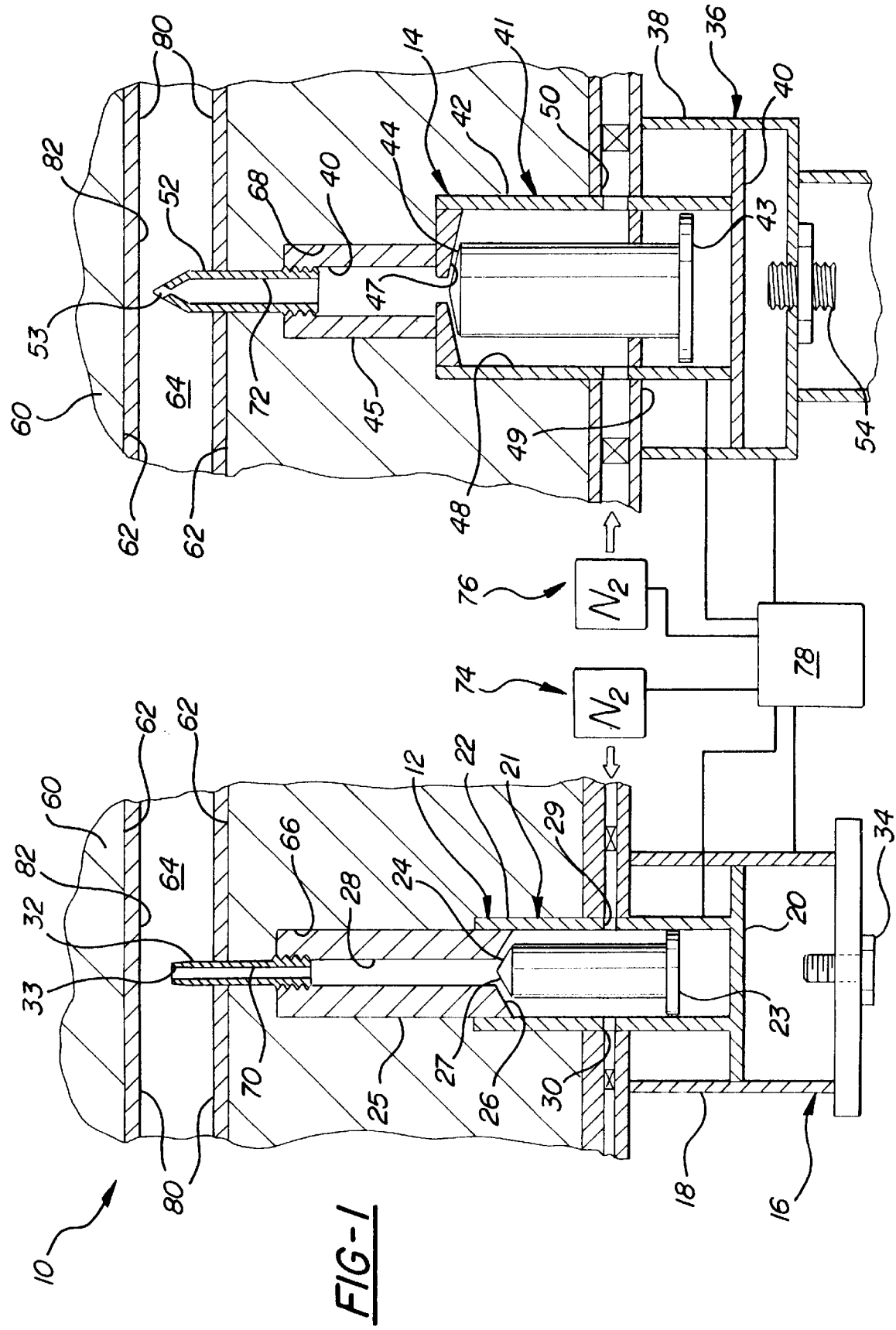
FIG. 1 illustrates a gas assisted injection molding system according to the present invention.

Referring to FIG. 1, a gas assisted injection molding system 10 generally comprises a gas injection pin 12 and a separate gas vent pin 14. The gas injection pin 12 and gas vent pin 14 are preferably yoked together via a spacer.

The gas injection pin 12 includes a first actuator 16, which preferably includes a first hydraulic cylinder 18 housing a first piston 20. A second actuator 21 is mounted on and is selectively reciprocated by the first piston 20. The second actuator 21 is actuated independently from the first actuator 16 and preferably comprises a second hydraulic cylinder 22 integrally formed with the first piston 20. A second piston 23 having a conical outer end 24. is disposed within the second hydraulic cylinder 22.

The injection pin 12 further includes a main body 25 extending axially from the second hydraulic cylinder 22. The main body 25 is preferably threaded or otherwise secured to an outer end of the second hydraulic cylinder 22. The main body 25 has a diameter smaller than that of the second hydraulic cylinder 22 and thereby defines a valve seat 26 complementary to the conical outer end 24 of the second piston 23. Together the valve seat 26 and conical outer end 24 of the second piston 23 form a valve 27.

A cylindrical passageway 28 extends through the hydraulic cylinder 22 and the main body 25 and is selectively interrupted by the valve 27. The cylindrical passageway 28 includes a gas inlet 29 and a gas outlet 30 extending radially from the passageway 28. A hollow nozzle 32 having a gas outlet 33 at an outer end is threadably fastened to the end of the main body 25 and in fluid communication with the cylindrical passageway 28. The injection pin 2 preferably includes an adjustment screw 34 for adjusting the piston travel.

The gas vent pin 14 is similar to the gas injection pin 12 and includes a first actuator 36, which preferably includes a first hydraulic cylinder 38 housing a first piston 40. A second actuator 41 is mounted on and is selectively reciprocated by the first piston 40. The second actuator 41 is actuated independently from the first actuator 36 and preferably comprises a second hydraulic cylinder 42 integrally formed with the first piston 40. A second piston 43 having a conical outer end 44 is disposed within the second hydraulic cylinder 42.

The vent pin 14 further includes a main body 45 extending axially from the second hydraulic cylinder 42. The main body 45 is preferably threaded or otherwise secured to an outer end of the second hydraulic cylinder 42. A valve seat 46 complementary to the conical outer end 44 of the second piston 43 is defined adjacent the main body 45. Together the valve seat 46 and conical outer end 44 of the second piston 43 form a valve 47.

A cylindrical passageway 48 extends through the hydraulic cylinder 42 and the main body 45 and is selectively interrupted by the valve 47. The cylindrical passageway 48 includes a gas inlet 49 and a gas outlet 50 extending radially from the passageway 48. A hollow nozzle 52 having a gas inlet 53 at an outer end is threadably fastened to the end of the main body 45 and in fluid communication with the cylindrical passageway 48. The vent pin 14 preferably includes an adjustment screw 54 for adjusting the upper limit of the piston travel.

As shown in FIG. 1, the gas assisted injection molding system 10 includes a mold 60 having an inner surface 62 defining a cavity 64 and or a separate gas channel. The gas injection pin 12 and gas vent pin 14 are each mounted in a recess 66, 68 in the mold 60 adjacent the inner surface 62. The nozzles 32, 52 of the gas injection pin 12 and gas vent pin 14 are selectively extended into the cavity 64 of the mold 60 through apertures 70, 72. A high pressure gas supply 74 and low pressure gas supply 76 supply gas to the inlets 29, 49 of the gas injection and gas vent pins 12, 14, respectively.

A controller 78 (shown schematically) controls the operation and sequence of the first actuators 16, 36, second actuators 21, 41, and gas supplies 74, 76. The controller 78 preferably comprises a PLC or a microprocessor with appropriate software, but could alternatively comprise hard-wired circuitry. The development of the necessary controls is well within the skill of the art, based upon the operation of the gas assisted injection molding system 10 described herein.

In operation, a calibrated short shot of resin 80 or a total cavity fill is introduced into the cavity 64. After initial resin 80 injection there is a gas injection delay time of approximately 0.3 to 5 seconds corresponding to the transfer point in conventional injection molding. At the end of the delay period the gas cycle begins. The first piston 20 moves the gas injection pin 12 and nozzle tip 32 into the resin 80 of the cavity 64 if it is not previously seated after mould close. The second piston 23 moves up simultaneously with the first piston 20 to maintain the seal of the cylindrical passageway 28. With the gas pin 12 and nozzle tip 32 inserted into the resin 80, the second piston 23 moves downward opening valve 27 of the cylindrical passageway 28 and allowing the pressurized or volumetric gas to flow from the gas supply 74 through the inlet 29 into the cylindrical passageway 28 cleaning the cylindrical passageway 28 of any resin 80 introduced by the initial movement and or initial seating. The pressure/volume is maintained during the cooling phase of the cycle, preferably approximately 20 to 50 seconds or more. During cooling, the first piston 20 is maintained in the upward position and the second piston 23 is maintained in the downward position, i.e. with the valve 27 open. As is well known, the pressurized gas displaces the molten resin 80 thereby forming a gas channel 82.

At the end of the cooling cycle, with the injection pin 12 extended into the gas channel 82, the vent pin 14 is extended into the gas channel 82 piercing the partially cooled wall of the resin 80. The first piston 40 of the vent pin 14 moves upwardly extending the nozzle 52 through the wall of the molded resin 80 and into the gas channel 82. The second piston 43 of the vent pin 14 moves simultaneously with first piston 40 to maintain closed the valve 47 in the passageway 48. Next, the second piston 43 moves downward, opening the valve 47 and the cylindrical passageway 48 while the first piston 40 remains up to maintain the position of the vent pin 14 in the gas channel 82; thereby venting the internal nitrogen gas from the gas channel 82 through the cylindrical passageway 48 and exiting the vent outlet 50.

At the end of the cycle, the second piston 23 of the gas injection pin 12 moves upwardly to close the valve 27 in the cylindrical passageway 28 while the first piston 20 moves downward to remove the nozzle 32 from the gas channel 82 and discontinue the flow of nitrogen to the cavity 64. As the first piston 20 is moving downward, the high pressure nitrogen effectively cleans the injection pin 12 of any residual resin 80. The gas injection pin 12 is reseated ready for the next shot/cycle and is clean from any resin plugging. An additional low pressure circuit may be utilized to insure all resin 80 is removed from the pin/nozzle 32.

Finally, with the vent pin 14 extended, the first piston 40 remaining in the upward position and the second piston 43 in the downward position, a low pressure or volume shot of nitrogen is introduced into the cylindrical passageway 48 of the vent pin 14 to insure cleaning of the vent pin 14. At the end of the low pressure shot, the main body 45 is retracted by moving the first piston 40 downward while the second piston 43 is moved upward reseating the conical outer end 44 of the second piston 43 against the valve seat 46 of the valve 47, thereby closing the cylindrical passageway 48 clean of any resin 80.

Figure 3:
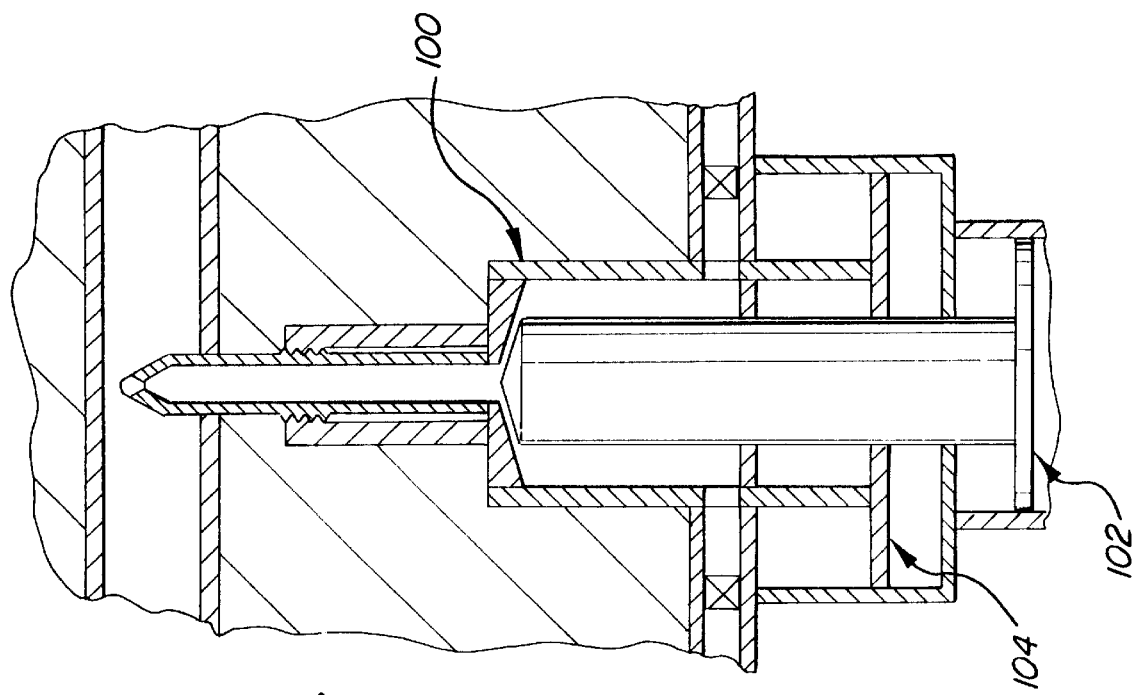
FIG. 3 illustrates an alternate embodiment of the gas vent pin of FIG. 1.
Figure 2:
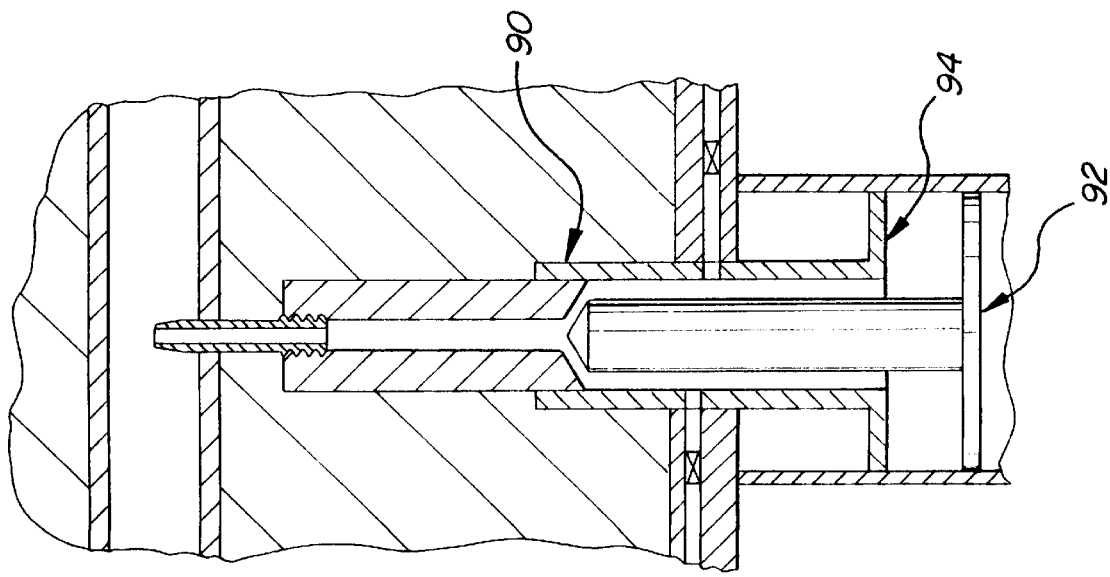
FIG. 2 illustrates an alternate embodiment of the gas injection pin of FIG. 1.

FIG. 2 illustrates an alternate gas injection pin 90 which can be utilized in the gas assisted injection molding system 10 of FIG. 1. The gas injection pin 90 is generally similar to that shown in FIG. 1; however, the first piston 92 and second piston 94 are configured differently. The first piston 92 and second piston 94 operate completely independently, i.e. the second piston 94 is not moved by the first piston 92. FIG. 3 illustrates an alternate gas vent pin 100 which can be utilized in the gas assisted injection molding system 10 of FIG. 1. The gas vent pin 100 is generally similar to that shown in FIG. 1; however, the first piston 102 and second piston 104 operate completely independently, i.e. the second piston 104 is not moved by the first piston 102.

In any of the above embodiments, it should be apparent that alternatively the gas injection pin may be used alone and perform both the injection and venting.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A gas assisted injection molding system comprising:
   a mold having an inner surface defining a cavity;
   a gas injection pin adjacent said inner surface and selectively extendable into said cavity;
   a gas supply supplying gas to said cavity via said gas injection pin;
   a gas vent pin adjacent said inner surface; and
   a gas vent valve selectively permitting said gas to exit said cavity via said gas vent pin.

2. The gas assisted injection molding system of claim 1 wherein said gas vent pin is selectively extendable into said cavity.

3. The gas assisted injection molding system of claim 2 further comprising a gas injection valve selectively permitting said gas to pass through said gas injection pin.

4. The gas assisted injection molding system of claim 3 wherein said gas vent valve is formed in said gas vent pin.

5. The gas assisted injection molding system of claim 4 further comprising a controller closing said gas injection valve before a first actuator extends said gas injection pin and opening said gas injection valve after said first actuator extends said gas injection pin.

6. The gas assisted injection molding system of claim 5 further comprising a controller closing said gas injection valve as said first actuator retracts said gas injection pin.

7. A gas injection molding system comprising:
   a mold having an inner surface defining a cavity;
   a gas pin adjacent said inner surface, said gas pin including a nozzle defining a passageway terminating in an gas outlet at an outer end of said nozzle;
   a first actuator for selectively extending and retracting said nozzle;
   a gas inlet continuous with said passageway in said nozzle;
   a valve mounted between said gas inlet and said gas outlet;
   a second actuator selectively opening and closing said valve to selectively restrict the passage of gas from said gas inlet to said gas outlet.

8. The gas injection molding system of claim 7 wherein said second actuator is moved by said first actuator.

9. The gas injection molding system of claim 8 wherein said first actuator comprises a first hydraulic cylinder.

10. The gas injection molding system of claim 9 wherein said second actuator comprises a second hydraulic cylinder extending from a first piston of said first hydraulic cylinder.

11. The gas injection molding system of claim 10 further comprising a controller closing said valve before said first actuator extends said nozzle and opening said valve after said first actuator extends said nozzle.

12. The gas injection molding system of claim 11 further comprising a controller closing said valve as said first actuator retracts said nozzle.

13. The gas injection molding system of claim 11 wherein said first and second actuators comprise a pair of nested cylinders.

\* \* \* \* \*